United States Patent [19]
Coleman

[11] Patent Number: 5,697,535
[45] Date of Patent: Dec. 16, 1997

[54] BULK MATERIAL CONTAINER WITH A SLIDING CAM LOCK CLOSURE PLATE

[75] Inventor: Clarence B. Coleman, Oakland, Calif.

[73] Assignee: Fabricated Metals, Inc., San Leandro, Calif.

[21] Appl. No.: 554,455

[22] Filed: Nov. 7, 1995

[51] Int. Cl.$^6$ ........................................ B67D 3/00
[52] U.S. Cl. ............................ 222/542; 222/561
[58] Field of Search ................ 251/203; 222/148, 222/542, 559, 561

[56] References Cited

U.S. PATENT DOCUMENTS

| | | | |
|---|---|---|---|
| 2,750,074 | 5/1956 | Dorey | 222/80 |
| 3,354,918 | 11/1967 | Coleman | 141/363 |
| 3,704,722 | 12/1972 | Coleman | 137/242 |
| 4,785,966 | 11/1988 | Waltke | 222/561 |

Primary Examiner—Philippe Derakshani
Attorney, Agent, or Firm—Jack M. Wiseman

[57] ABSTRACT

A bulk material container comprises a discharge opening defined by a discharge assembly. A sliding gate overlays the discharge opening for preventing bulk material to advance through the discharge assembly. The sliding gate is withdrawn from the position overlaying the discharge opening to discharge material from the bulk material container through the discharge assembly into a hopper. A closure seal surrounds the discharge opening. When the sliding gate is disposed over the discharge opening, cam assemblies raise the sliding gate into compressive sealing engagement with the closure seal. When the cam assemblies lower the sliding gate, the sliding gate is withdrawn from the discharge assembly. Wipers mounted on the discharge assembly remain in contact with the sliding gate to remove bulk material that may remain on the sliding gate while the sliding gate is withdrawn from the discharge assembly.

28 Claims, 6 Drawing Sheets

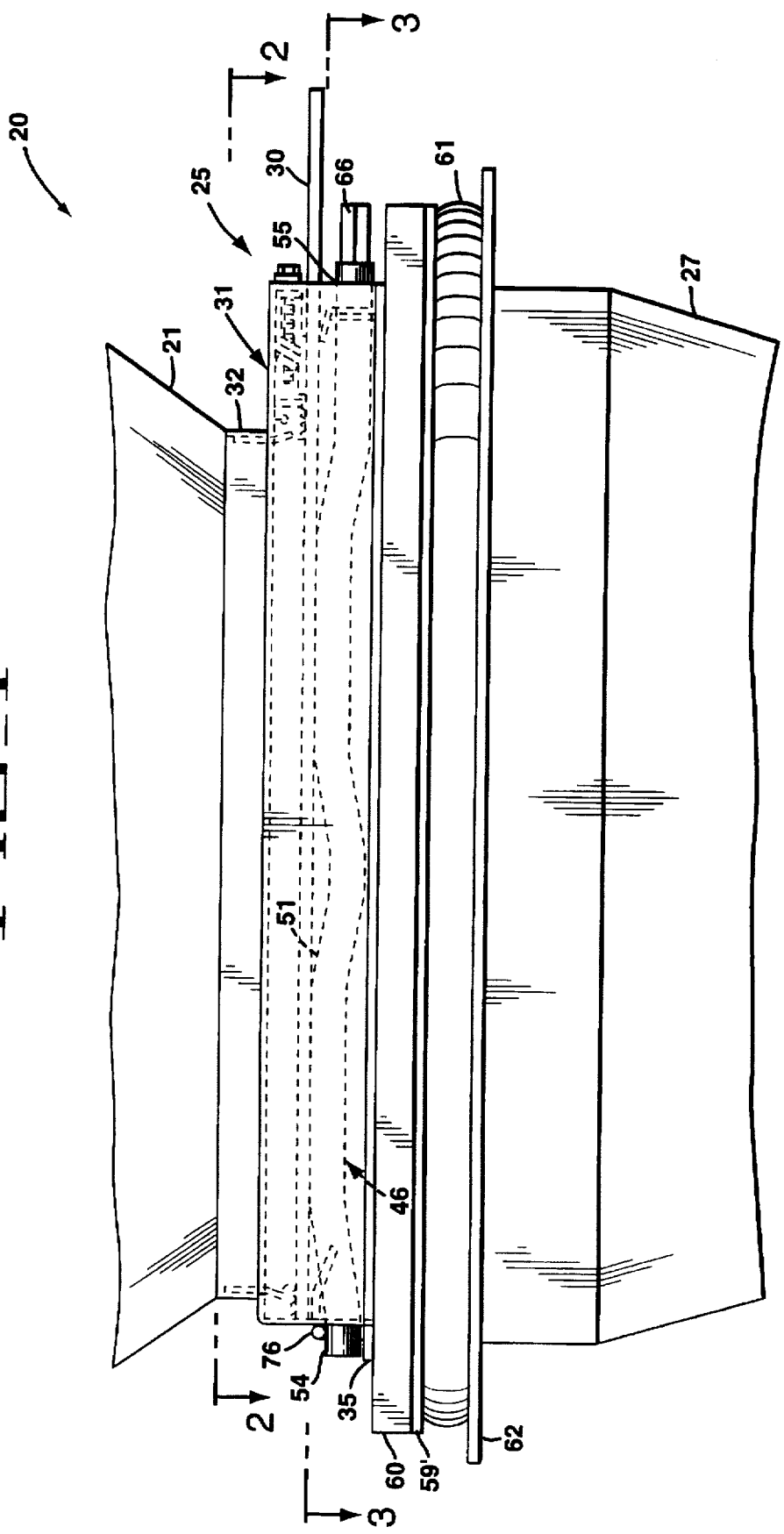
FIG_1

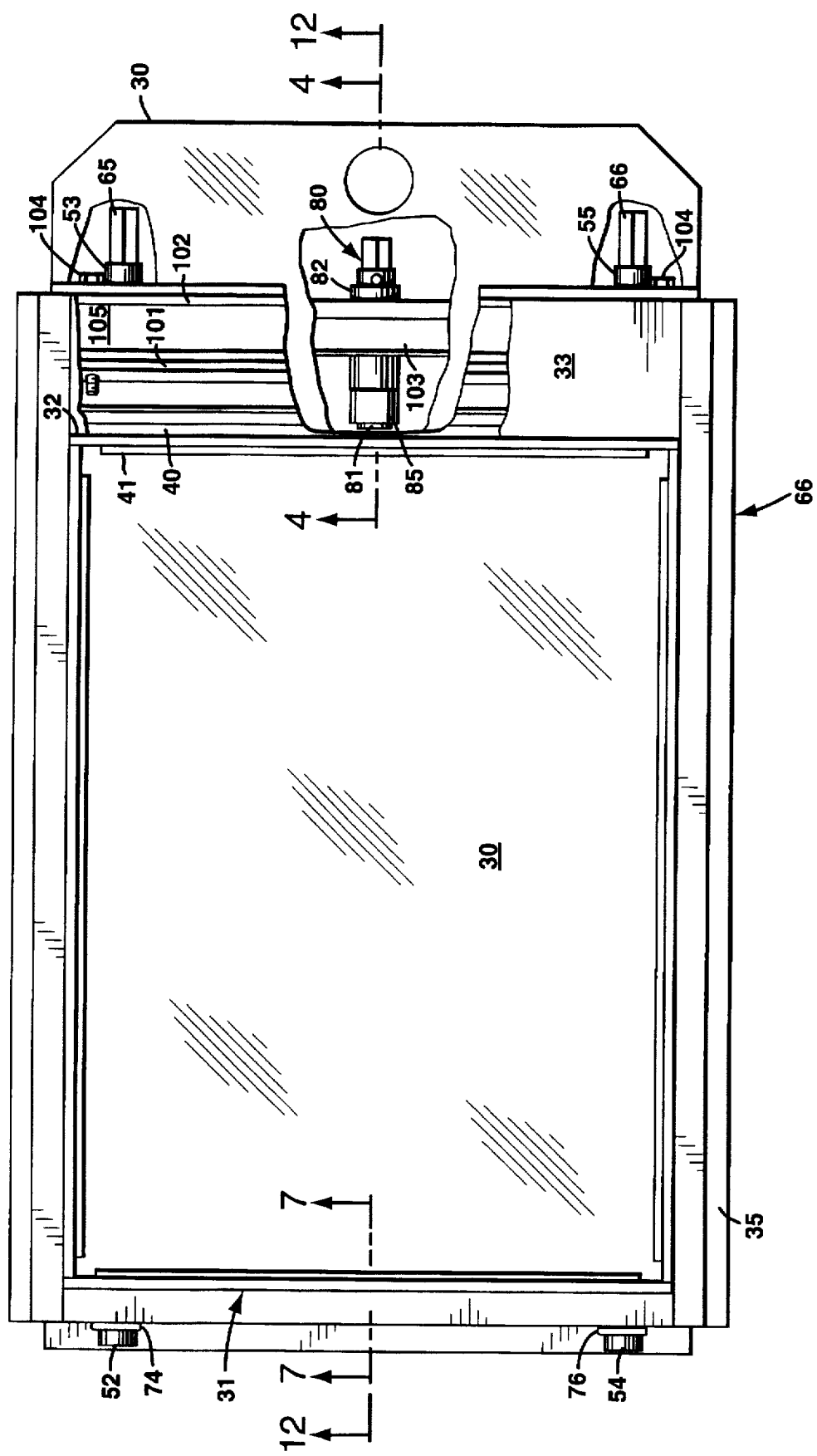

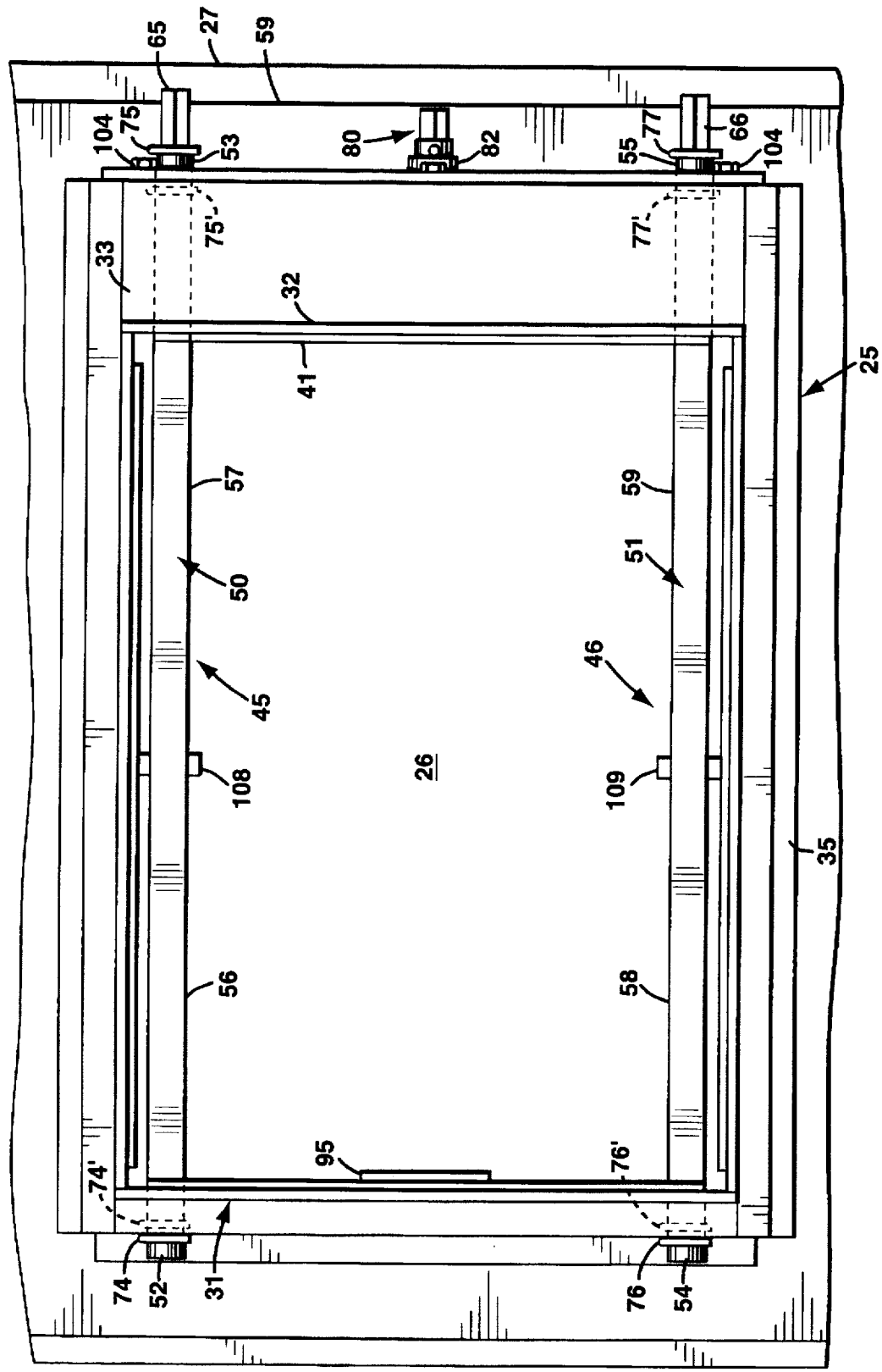

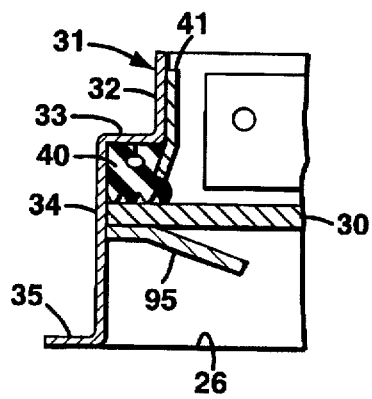
FIG_7
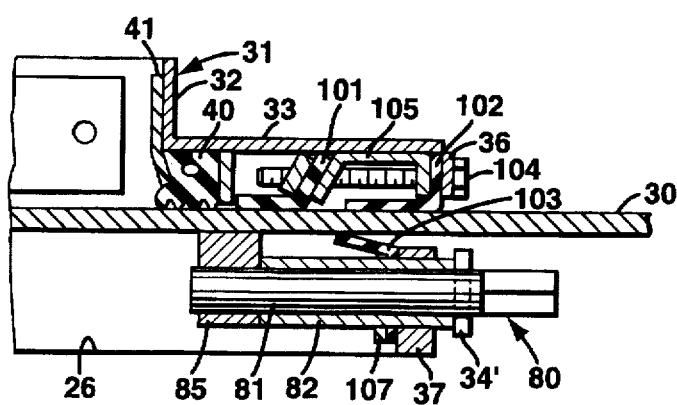
FIG_4
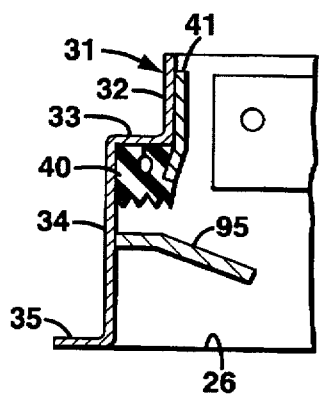
FIG_8
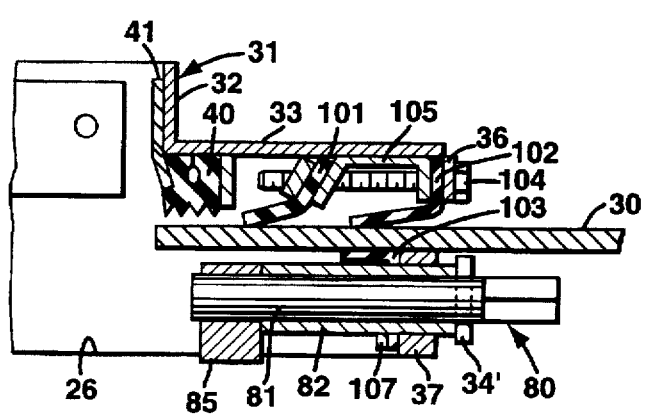
FIG_5
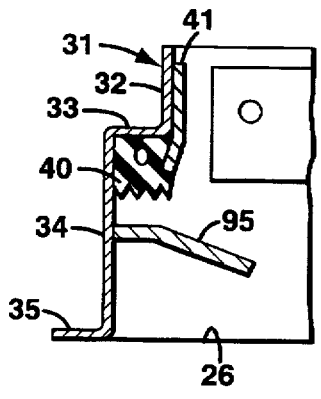
FIG_9
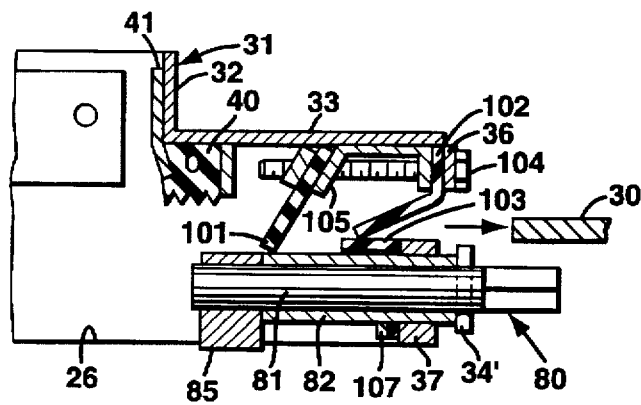
FIG_6

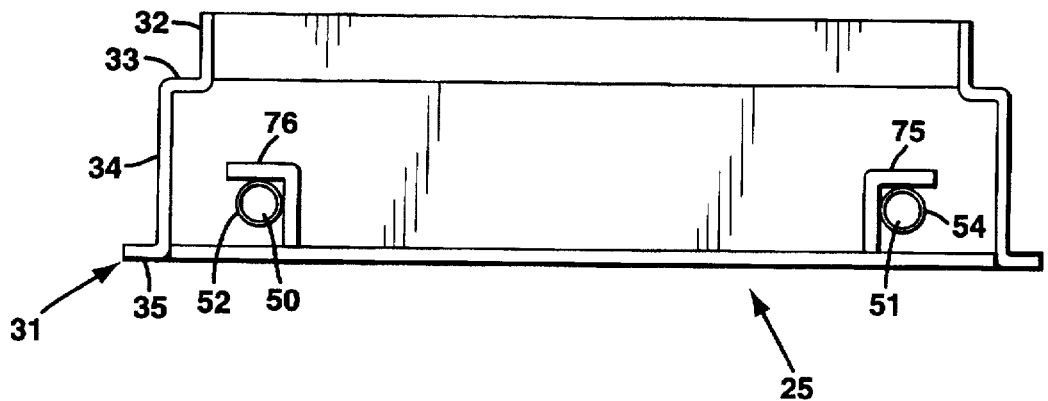
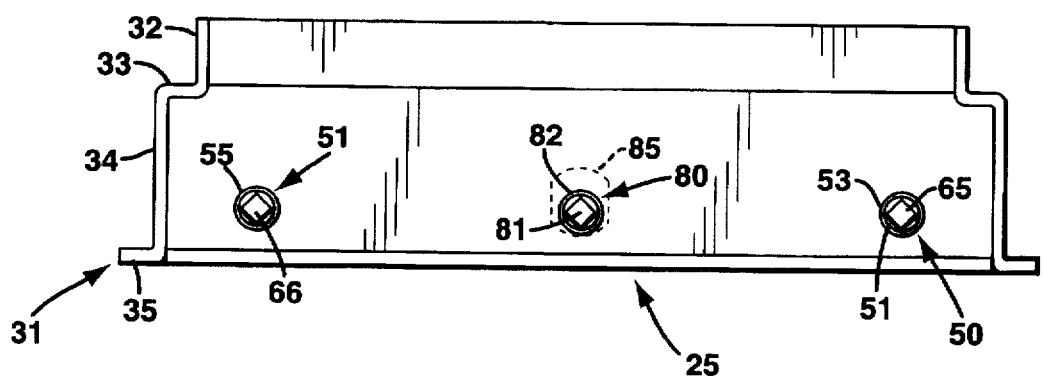
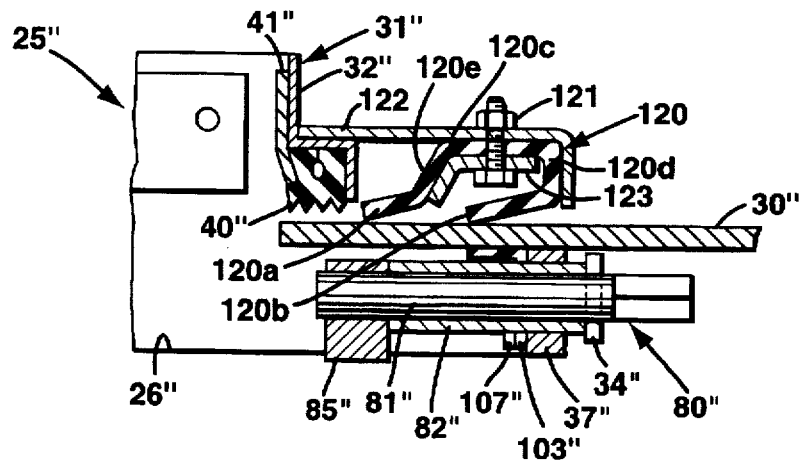

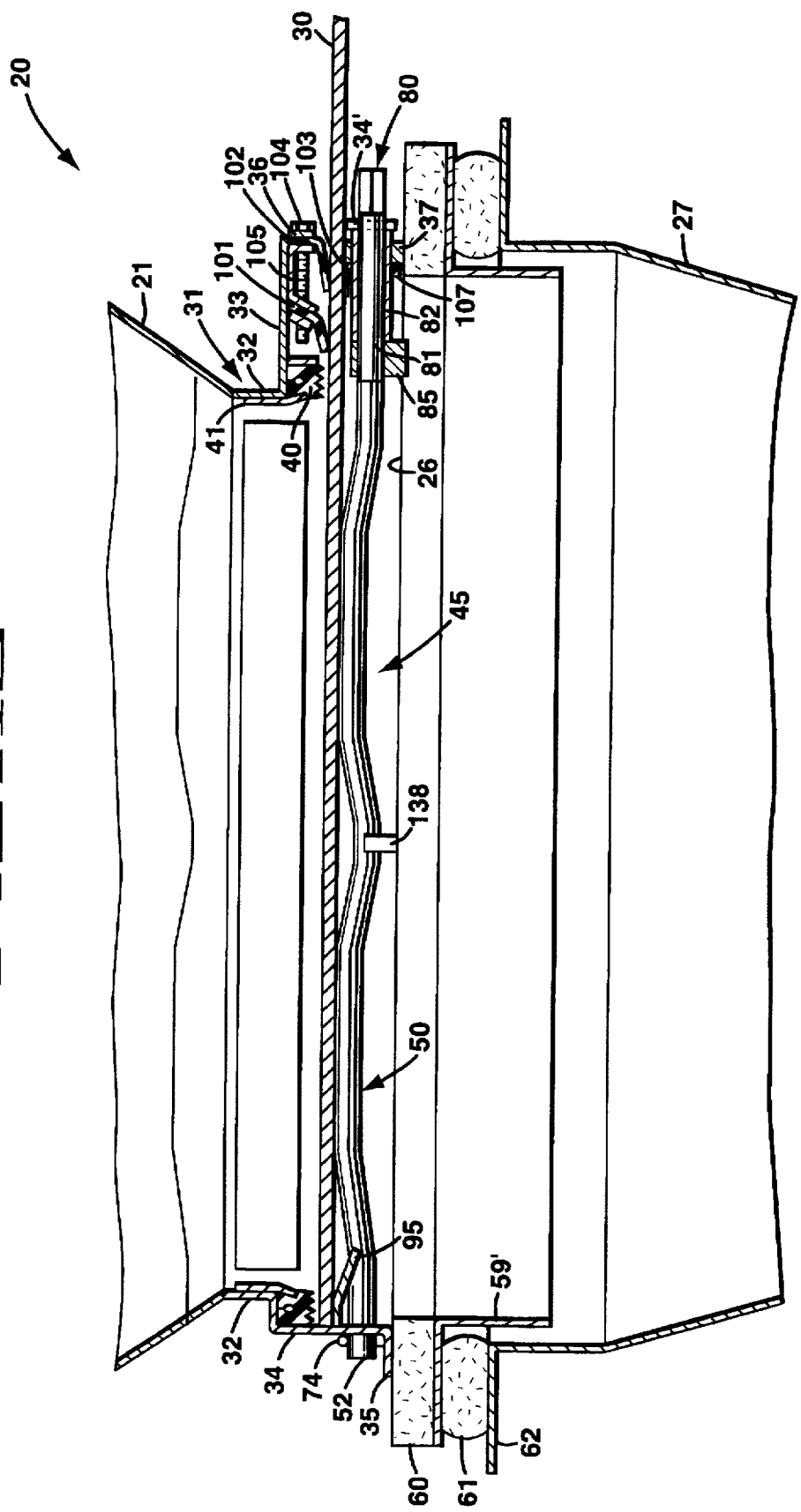

BULK MATERIAL CONTAINER WITH A SLIDING CAM LOCK CLOSURE PLATE

BACKGROUND OF THE INVENTION

The present invention relates in general to bulk material containers and, more particularly, to a bulk material container having a sliding cam lock closure plate.

Heretofore, bulk material containers included a discharge opening defined by a frame. The frame was constructed to receive a slidable closure plate that either overlaid the discharge opening or was removed from the discharge opening. An annular surface of the frame that defined the discharge opening had an upper seal that faced downwardly toward the upper surface of the closure plate when the closure plate overlaid the discharge opening. A bracket on the frame carried a sealing gasket that faced downwardly toward the upper surface of the closure plate when the closure plate overlaid the discharge opening. Cams were mounted on opposite sides of the frame confronting the lower surface of the closure plate to support the closure plate while the closure plate overlaid the discharge opening. In one position, the cams urged the closure plate into sealing engagement with the upper seal. In another position, the cams enabled the closure plate to be lowered for withdrawing the closure plate from the frame. During the withdrawal of the closure plate, the sealing gasket engaged the upper surface of the closure plate to provide a wiping action. The foregoing bulk material container has been described in detail in the patent to Coleman, U.S. Pat. No. 3,704,722, granted on Dec. 5, 1972, for Cam And Door Assembly.

Heretofore, when the cams were rotated to lower the closure plate away from the upper seal, a space appeared between the upper seal and the closure plate. The space was large enough to allow the closure plate to slide free of the top or upper seal. The space enabled bulk material to escape under the upper seal onto the closure plate. The bulk material on the closure plate could fall from the closure plate onto the floor. The falling of bulk material onto the floor was undesirable and could be hazardous.

SUMMARY OF THE INVENTION

A bulk material container comprising a discharge opening defined by a discharge assembly. A closure plate is adapted for slidable movement relative to the opening in the discharge assembly. The closure plate, at times, overlays the discharge opening to inhibit bulk material from being discharged through the opening of the discharge assembly and, at other times, the closure plate is withdrawn from the discharge assembly to enable bulk material to be discharged through the opening of the discharge assembly. A closure seal on the discharge assembly surrounds the discharge opening. When the closure plate is disposed over the discharge opening to inhibit the flow of bulk material through the discharge opening, cam means raise the closure plate into compressive engagement with the closure seal. When the cam means are lowered to release the closure plate from sealing engagement with the closure seal, the closure plate is lowered and withdrawn to enable bulk material to flow through the opening of the discharge assembly. Wipers mounted on the discharge assembly above and below the closure plate remain in contact with the closure plate to remove bulk material that may remain on or cling to the closure plate while the closure plate is withdrawn from the discharge assembly.

An object of the present invention is to provide a bulk material container with a cam lock closure plate wherein wipers remove bulk material from the closure plate while the closure plate is withdrawn from the frame.

Another object of the present invention is to provide a bulk material container with a cam lock closure plate wherein wipers remove bulk material clinging to the surfaces of the closure plate and seal the discharge opening of the container when the closure plate is withdrawn from the frame.

A feature of the present invention is that a second set of the wipers provides a secondary wiping action to the wiping action performed by the closure seal.

Another object of the present invention is to provide a bulk material container with a cam lock closure plate in which a guide positions the closure plate during the end of the sliding movement of the closure plate as the closure plate assumes the position of overlaying fully the discharge opening.

BRIEF DESCRIPTION OF THE DRAWINGS

FIG. 1 is a fragmentary front elevational view of the bulk material container embodying the present invention illustrated with a hopper.

FIG. 2 is a horizontal sectional view of the bulk material container shown in FIG. 1 taken along line 2—2 of FIG. 1 with parts thereof broken away to illustrate a centrally located cam assembly and ends of outboard cam assemblies.

FIG. 3 is a horizontal sectional view of the bulk material container shown in FIGS. 1 and 2 taken along line 3—3 of FIG. 1.

FIG. 4 is a vertical sectional view of the bulk material container shown in FIGS. 1-3 taken along line 4—4 of FIG. 2 illustrating a closure plate overlaying the discharge opening of a discharge assembly of the bulk material container and a center cam assembly of the discharge assembly in the cam lock position.

FIG. 5 is a vertical sectional view of the bulk material container shown in FIGS. 1-3 taken along line 4—4 of FIG. 2 illustrating the closure plate partially withdrawn from the discharge assembly of the bulk material container and the center cam assembly of the discharge assembly in the cam unlock position.

FIG. 6 is a vertical sectional view of the bulk material container shown in FIGS. 1-3 taken along line 4—4 of FIG. 2 illustrating the closure plate withdrawn from the discharge assembly of the bulk material container and the center cam assembly of the discharge assembly in the cam unlock position.

FIG. 7 is a vertical sectional view of the bulk material container shown in FIGS. 1-3 taken along line 7—7 of FIG. 2 when the closure plate is fully overlaying the discharge opening of the discharge assembly of the bulk material container and the closure plate is lifted to the seal position.

FIG. 8 is a vertical sectional view of the bulk material container shown in FIGS. 1 and 2 taken along line 7—7 of FIG. 2 when the closure plate is partially withdrawn from the discharge assembly of the bulk material container.

FIG. 9 is a vertical sectional view of the bulk material container shown in FIGS. 1-3 taken along line 7—7 of FIG. 2 when the closure plate has been withdrawn from the discharge assembly of the bulk material container.

FIG. 10 is an end elevational view of the back end of the discharge assembly of the bulk material container shown in FIGS. 1-3.

FIG. 11 is an end elevational view of the discharge assembly of the bulk material container shown in FIGS. 1-3 opposite from the end of the discharge assembly shown in FIG. 10.

FIG. 12 is a vertical sectional view of the bulk material container shown in FIGS. 1–11 taken along line 12—12 of FIG. 2.

FIG. 13 is a vertical sectional view taken along line 4—4 of FIG. 2 to illustrate an integrally formed wiper to provide secondary wiping or scraping of bulk material that remains on or clings to the upper surface of the closure plate and a wiper to provide wiping or scraping of bulk material that remains on or clings to the lower surface of the closure plate.

DESCRIPTION OF THE PREFERRED EMBODIMENT

Illustrated in FIG. 1 is a fragmentary showing of a bulk material container 20 embodying the present invention. The bulk material container comprises a well-known open bottom bin 21. A discharge assembly 25 of the bulk material container 20 is disposed at the bottom of the bin 21. Disposed below the discharge assembly 25 is a suitable hopper 27.

The discharge assembly 25 defines a rectangular discharge opening 26 (FIG. 3) that communicates with the hopper 27. A rectangular, slidable closure plate or door 30 (FIG. 2) slides horizontally over a path between a position overlaying the discharge opening 26 to inhibit bulk material from advancing through the opening 26 of the discharge assembly 25 and a position withdrawn from the discharge opening 26 to enable bulk material discharged from the bin 21 to advance through the opening 26 of the discharge assembly 25 into the hopper 27. In the exemplary embodiment, the closure plate 30 is made of suitable material, such as steel, aluminum, stainless steel, plastic and the like.

The discharge assembly 25 comprises a generally rectangular housing 31 (FIG. 2) made of suitable material, such as steel. The housing 31 includes upright walls 32. Joined to the upright walls 32 along the rear and sides thereof are upright walls 34 (FIG. 12). Each of the upright walls 34 at the bottom thereof terminates in a base or horizontal flange 35. At the front end thereof, the upright walls 32 are joined by a horizontal wall 33. Depending from the horizontal wall 33 above the closure plate 30 is an upright wall 36. Another upright wall 37 at the front of the housing 31 is disposed below the closure plate 30.

Fixedly positioned against the rectangular shoulder formed by the walls 33 and 34 is a suitable closure seal 40 having a rectangular frame configuration (FIGS. 4–9). In the exemplary embodiment, the closure seal 40 is a gasket extrusion made of suitable material, such as ethylene, propylene, diene monomer and the like. For fixedly securing the closure seal 40 to the housing 31, a rectangular forward plate 41 made of suitable material, such as steel, clamps the closure seal 40 to the shoulder formed by the walls 33 and 34 of the discharge assembly 25. The forward plate 41 is secured to the wall 32 of the frame 25 by suitable means, such as welding or nuts and bolts. When the closure plate 30 is in position fully overlaying the discharge opening 26, the closure seal 40 reduces the escape of bulk material through the discharge assembly 25. While the closure plate 30 is withdrawn from the discharge assembly 25, the closure seal 40 remains generally in contact with the upper surface of the closure plate 30.

To minimize the leakage of bulk material from the discharge assembly 25, while the closure plate 30 fully overlays the discharge opening 26, cam assemblies 45 and 46 (FIGS. 1 and 3) of the discharge assembly 25 urge the closure plate 30 into compressive engagement with the closure seal 40.

Toward this end, cam assemblies 45 and 46 comprise, respectively, parallel, elongated eccentric cam rods 50 and 51. The spaced apart cam rods 50 and 51 extend in the direction that the slidable closure plate 30 moves relative to the discharge assembly 25.

In the exemplary embodiment, the cam rod 50 is journalled for rotation by suitable bushings 52 and 53 located at opposite ends of the cam rod 50. In the exemplary embodiment, the cam rod 51 is journalled for rotation by suitable bushings 54 and 55 located at opposite ends of the cam rod 51. The bushings 52 and 54 are secured to one end of the vertical wall 34 of the housing 31 by suitable means, such as welding, and the bushings 53 and 55 are secured to the opposite end of the vertical wall 34 by suitable means, such as welding. Various arrangements may be employed for journalling the cam rods 50 and 51 for rotation. For example, at the rear end of each cam rod, a rear bearing may be disposed inboard of the rectangular wall 34. The rectangular wall 34 is suitably apertured to receive the rear end of the associated cam rod.

The cam rod 50 comprises eccentric camming surfaces 56 and 57 and the cam rod 51 comprises eccentric camming surfaces 58 and 59. The greater radially extending surfaces of the camming surfaces 56–59 serve to urge the closure plate 30 into compressive engagement with the closure seal 40. The radially reduced surfaces of the camming surfaces of the camming surfaces 56–59 enable the closure plate to be released from compressive engagement with the closure seal 40 when the closure plate 30 is to be moved for opening or closing the opening 26 of the discharge assembly 25. While the closure plate 30 is within the discharge assembly 25 and overlaying the discharge opening 26, it is supported by the cam assemblies 45 and 46.

When withdrawal of the closure plate 30 is desired for material in the bin 21 to be discharged through the opening 26 of the discharge assembly 25 into the hopper 27, the cam rods 50 and 51 are rotated. The rotation of the cam rods 50 and 51 enables the closure plate 30 to be released from compressive engagement with the closure seal 40 while the radially reduced surfaces of the cam rods 50 and 51 support the closure plate 30. Thus, the closure plate 30 is released from compressive engagement with the closure seal 40 to enable the closure plate 30 to be slidably withdrawn from the discharge assembly 25.

The hopper 27 (FIG. 1) is disposed below the discharge assembly 25 to receive bulk material advancing through the opening 26 of the discharge assembly 25 while the closure plate 30 is withdrawn from the discharge assembly 25. Between the base 35 and a rectangular frame 59' of the hopper 27 is a suitable, frame-shaped seal 60. In the exemplary embodiment, the seal 60 is made of an abrasion resistant elastomer. The seal 60 seals the surface between the discharge assembly 25 and the hopper 27. Between the rectangular frame 59' of the hopper 27 and flange 62 of the hopper 27 is a suitable rectangular, frame-shaped gasket seal 61 (FIG. 12). The gasket seal 61 is made of suitable material, such as neoprene or a spongy-type elastomer. There is a flat surface on all four ends of the discharge assembly 25 (FIG. 12). The back and two sides of the base 35 seat against the elastomer seal 60. The fourth side of the base 35 uses a rectangular bar for sealing between the elastomer seal 60 and the closure plate 30. To take up any irregularities that may develop in sealing the base 35 of the discharge assembly 25 and the flange 62 of the hopper 27, the elastomer seal 61 has been provided. The elastomer seal 60 is applied between the top of the frame 59' and the base 35. The spongy elastomer seal 61 is applied between the bottom of the frame 59' and the flange 62 of the hopper 27 to take up irregularities caused by the usage of the discharge assembly 25 and the hopper 27.

To inhibit the flow of bulk material from the bin 21 through the opening 26 of the discharge assembly 25, the closure plate 30 is moved into the discharge assembly 25 to overlay entirely the discharge opening 26 and to be supported by the reduced radial surfaces of the cam rods 50 and 51. Thereupon, the cam rods 50 and 51 are rotated for the radially greater surfaces of the cam rods 50 and 51 to move the closure plate 30 into compressive engagement with the closure seal 40. When the closure plate 30 is in compressive engagement with the closure seal 40, the closure seal 40 forms a bulbous extrusion underlaying a plate 41 (FIG. 7).

The angular rotation and positioning of the cam rods 50 and 51, respectively, are achieved by means of extension sections 65 and 66, which are formed to provide respective ends for accommodating a square wrench or any suitable angled wrench (FIG. 3). With a suitable square wrench or the like, an operator may rotate the cam rods 50 and 51, respectively, to their desired position. Right angular rotational stops 74–77 are provided to prevent over travel of the rotation of the cam rods 50 and 51 (FIGS. 3 and 10). The rotational stops 74 and 75 are welded to the camming rod 50 and prevent over travel by engaging the base 35 of the discharge assembly 25 and the rotational stops 76 and 77 are welded to the cam rod 51 and prevent over travel by engaging the wall 37. Pins 74' and 75' are disposed at opposite ends of the cam rod 50 to limit the axial displacement of the cam rod 50. Similarly, pins 76' and 77' are disposed at opposite ends of the cam rod 51 to limit the axial displacement of the cam rod 51. When rear bearings are used, the opposite ends of the cam rods 50 and 51 may be provided with rotational stops and displacement limiting pins.

When the closure plate 30 is wider than a selected dimension, by way of example nine inches, it may be desired to employ a center cam assembly 80 (FIGS. 2–6). The center cam assembly 80 is disposed in parallel relation to the cam assemblies 45 and 46 midway therebetween. The cam assembly 80 comprises a cam rod 81 journalled for rotation by a suitable bushing 82. The bushing 82 is secured to the vertical wall 37 of the discharge assembly 25 by suitable means, such as welding. Fixed to cam rod 81 by suitable means, such as welding, is an eccentric cam 85.

The eccentric cam 85 has a greater radially extending camming surface to urge the closure plate 30 into compressive engagement with the closure seal 40. The radially reduced camming surface of the cam 85 releases the closure plate 30 from compressive engagement with the closure seal 40. While the closure plate 30 is within the discharge assembly 25, it is supported by the cam assembly 80.

When withdrawal of the closure plate 30 is desired for material in the bin 21 to be discharged through the opening 26 of the discharge assembly 25 into the hopper 27, the cam rod 81 is rotated in the manner the cam rods 50 and 51 are rotated. The rotation of the cam rod 81 enables the closure plate 30 to be released from compressive engagement with the closure seal 40 in the manner the cam rods 50 and 51 release the closure plate 30 from engagement with the closure seal 40. The closure plate 30 is released from compressive engagement with the closure seal 40 to enable the closure plate 30 to be slidably withdrawn from the discharge assembly 25.

To inhibit the flow of bulk material from the bin 21 through the opening 26 of the discharge assembly 25, the closure plate 30 is inserted into the discharge assembly 25 to overlay the discharge opening 26 and to be supported by the radially reduced surfaces of the cam rods 50 and 51, as well as by the radially reduced surface of the cam rod 81. The cam rods 50 and 51 are rotated to move the closure plate 30 into compressive engagement with the closure seal 40. The cam rod 81 is also rotated to move the closure plate 30 into compressive engagement with the closure seal 40.

The angular rotation of the rod 81 is achieved by means of an extension section, which is formed to accommodate a square wrench or the like (FIG. 11). By a conventional square wrench or the like, an operator may rotate the rod 81 to its desired position. Welded to the bushing 82 is a right angular rotational stop, not shown, which is similar to the right angular rotational stops heretofore described for the cam rods 50 and 57. The right angular rotational stop engages the wall 37 to prevent over travel of the rotation of the rod 81. A pin, not shown, disposed at the end of the cam rod 80 limits the axial displacement of the cam rod 81 in a manner heretofore described for the pins 74'–77'. The cam assembly 80 improves the sealing engagement between the closure seal 40 and the closure plate 30 and reduces the need for a thicker closure plate when a wider closure plate is employed.

To position the closure plate 30 in its movement into the discharge assembly 25 during the period the closure plate 30 has substantially completed its sliding movement to fully overlay the discharge opening 26, a guide plate 95 is secured to the upright wall 34 of the discharge assembly 25 by suitable means, such as welding (FIGS. 7–9 and 12). The guide plate 95 is located midway between the camming rods 50 and 51 and is disposed to engage the closure plate 30 when the closure plate 30 is approaching the position fully overlaying the opening 26 and while it is supported by the reduced radial surfaces of the camming rods 50 and 51. The free end of the guide plate 95 is directed downwardly with a gradual slope to serve as a ramp in the guiding of the movement of the closure plate 30. When the closure plate 30 is wider than a selected dimension, by way of example nine inches, it may be desired to employ the guide plate 95.

When the cam rods 50, 51 and 81 are rotated to release the closure plate 30 from compressive engagement with the closure seal 40, a space appears between the closure seal 40 and the closure plate 30. As a consequence thereof, bulk material passes under the closure seal 40 to accumulate on the upper surface of the closure plate 30. The bulk material may also cling to the lower surface of the closure plate 30 as the closure plate 30 is withdrawn from the discharge assembly 25.

In order to remove bulk material from the closure plate 30 while the closure plate 30 is slidably moved for withdrawal from the discharge assembly 25, wipers 101–103 are provided (FIGS. 4 and 5). The wipers 101–103 remain in contact with the closure plate 30 as the closure plate 30 is withdrawn from the discharge assembly 25 to provide secondary wiping or scraping of the bulk material that remains on or clings to the closure plate 30. The hopper 27 extends outwardly of the perimeter of the discharge assembly 25 (FIG. 1) to receive bulk material removed from the closure plate 30 as the closure plate 30 is withdrawn from the discharge assembly 25. The wipers 101–103 not only provide a secondary wiping action, but, also provide a sealing action during the withdrawal of the closure plate 30 from the discharge assembly 25 against leakage of bulk material that would otherwise escape through the aforementioned space. In the exemplary embodiment, the wipers 101–103 are made of neoprene.

As shown in FIG. 4, the wiper 101 has an angular cross-sectional area with a foot section engaging the upper surface of the closure plate 30 while the closure plate 30 overlays the discharge opening 26 in a compressive engagement with the seal 40. A leg section of the wiper 101 is clamped to a bracket 105 by a screw 104. The bracket 105 is secured to the horizontal wall 33 by suitable means, such as welding. The wiper 102 has a right angular cross-sectional area with a foot section engaging the upper surface of the closure plate 30 while the closure plate 30 overlays the discharge opening 26 in compressive engagement with the seal 40. A leg section of the wiper 102 is clamped by a screw 104 between the bracket 105 and the wall 36. While the closure plate 30 is released from the compressive engagement with the closure seal 40 for removal of the closure plate 30 from the discharge assembly 25 (FIG. 5), the foot sections of the wipers 101 and 102 move downwardly and remain in contact with the upper surface of the closure plate 30 maintaining a wiping action therewith. When the closure plate 30 is completely withdrawn from the discharge assembly 25 (FIG. 6), the foot sections of the wipers 101 and 102 are fully extended in the downward direction. The wipers 101 and 102 extend over the entire width of the closure plate 30 and are slightly larger in extension than the width of closure plate 30.

The wiper 103 has an angular cross-sectional area with an arm section extended in the upwardly direction and engages the lower surface of the closure plate 30 while the closure plate 30 overlays the discharge opening 26 in compressive engagement with the seal 40 (FIG. 4). The body section of the wiper 103 is clamped to an upright wall 37 of the discharge assembly 25 by a bracket 107. The bracket 107 and the body section of the wiper 103 are formed with an opening to receive the bushing 82 of the cam rod assembly 80. The bracket 107 is secured to the upright wall 37 of the discharge assembly 25 by suitable means, such as nuts and bolts. The wiper 103 serves to wipe the underside of the closure plate 30. The wiper 103 springs up when the closure plate 30 is removed to make contact with the wiper 102, thereby closing the opening created by the removal of the closure plate 30 (FIG. 6).

While the closure plate 30 is released from the compressive engagement with the closure seal 40 for removal of the closure plate 30 from the discharge assembly 25 (FIG. 5), the arm section of the wiper 103 moves downwardly at right angles to the body section of the wiper 103 and firmly engages the lower surface of the closure plate 30 to wipe the same while the closure plate 30 is withdrawn from the discharge assembly 25. When the closure plate 30 is completely withdrawn from the discharge assembly 25 (FIG. 6), the arm section of the wiper 103 remains at right angles to the body section of the wiper 103 and engages the foot of the wiper 102. The wiper 103 extends over the entire width of the closure plate 30 and is slightly larger in extension than the width of the closure plate 30.

Bars 108 and 109 (FIG. 3) are secured to the discharge assembly 25 for supporting the cam rods 50 and 51, respectively, midway between the ends thereof. Should it be desired to remove the discharge assembly 25 for maintenance, a frame-shaped flange, not shown, is welded to the wall 32 of the discharge assembly 25. The frame-shaped flange is bolted to a corresponding frame-shaped flange at the discharge end of the bin 21.

Illustrated in FIG. 13 is a wiper 120 which is an integration of the wipers 101 and 102 shown in FIGS. 4–6. In FIG. 13, parts similar in construction and operation to the parts illustrated in FIGS. 1–12 have been designated with the same reference numeral and a double prime suffix. The wiper 120, in the preferred embodiment, is a unitary structure. By virtue of the one-piece wiper 120, the installation of wipers for the closure plate has been facilitated. In the exemplary embodiment, the wiper 120 is made of neoprene, elastomer, or a suitable rubber material. FIG. 13 illustrates the closure plate 30" partially withdrawn from the discharge assembly 25" and the center cam assembly 80" of the discharge assembly 25" in the cam unlock position.

As shown in FIG. 13, the wiper 120 comprises an angular cross-sectional area with a rearward foot section 120a that engages the upper surface of the closure plate 30" while the closure plate 30" overlays the discharge opening 26" and the closure plate 30" is in compressive engagement with the seal 40". The wiper 120 also comprises an angular cross-sectional area with a forward foot section 120b engaging the upper surface of the closure plate 30" while the closure plate 30" overlays the discharge opening 26" and the closure plate 30" is in compressive engagement with the seal 40". The wiper 120 comprises a horizontal cross-sectional area with a clamping section 120c. Between the clamping section 120c and the foot 120b, the wiper 120 comprises a cross-sectional area with a vertical leg section 120d. Between the clamping section 120c and the foot section 120a, the wiper 120 comprises a cross-sectional area with an angular leg section 120e.

A suitable fastener, such as nut and bolt 121, secures the wiper 120 at the clamping section 120c thereof to a horizontal wall 122. The horizontal wall 122 is similar in construction and function to the horizontal wall 33 heretofore described. The wall 122 differs from the wall 33 in that it includes a depending section that engages the leg section 120d of the wiper 120. A clamping plate 123 is disposed between the head of the fastener 121 and the clamping section 120c of the wiper 120 to secure the wiper 120 to the horizontal wall 122. An angular section of the clamp plate 123 engages the angular leg section 120e of the wiper 120.

While the closure plate 30" is released from the compressive engagement with the closure seal 40" for withdrawal of the closure plate 30" from the discharge assembly 25" in a manner heretofore described for the closure plate 30 and the closure seal 40, the foot sections 120a and 120b of the wiper 120 move downwardly and remain in contact with the upper surface of the closure plate 30" maintaining a wiper action therewith. When the closure plate 30" is completely withdrawn from the discharge assembly 25", the foot sections 120a and 120b of the wiper 120 are fully extended in the downward direction. The wiper 120 extends over the entire width of the closure plate 30" and is slightly larger in extension than the width of the closure plate 30".

What is claimed is:

1. A discharge assembly for a bulk material container comprising:

(a) a housing defining a discharge opening;

(b) a closure seal in said housing surrounding said discharge opening;

(c) a slidable closure plate disposable between a position overlaying said discharge opening and a position withdrawn from said housing, said closure plate being in engagement with said closure seal while in position overlaying said discharge opening;

(d) camming means in said housing rotatable to urge said closure plate into compressive engagement with said closure seal and rotatable to release said closure plate from compressive engagement with said closure seal to enable said closure plate to be withdrawn from said housing; and (e) a first wiper mounted in said housing to engage said closure plate while said closure plate is withdrawn from said housing for removing bulk material from said closure plate as said closure plate is being withdrawn from said housing.

2. A discharge assembly as claimed in claim 1 wherein said housing has an exit end for the withdrawal of said closure plate from said housing and wherein said first wiper is disposed adjacent the exit end of said housing.

3. A discharge assembly as claimed in claim 2 wherein said first wiper extends in a direction perpendicular to the direction in which said closure plate is slidable and extends a distance at least as great as the dimension of said closure plate perpendicular to the direction in which said closure plate is slidable.

4. A discharge assembly as claimed in claim 2 wherein said closure plate has an upper surface and a lower surface, and wherein said first wiper engages the upper surface of said closure plate.

5. A discharge assembly as claimed in claim 3 wherein said closure plate has an upper surface and a lower surface and wherein said first wiper engages the upper surface of said closure plate.

6. A discharge assembly as claimed in claim 4 and comprising a second wiper mounted in said housing to engage the lower surface of said closure plate for removing bulk material from said closure plate as said closure plate is being withdrawn from said housing and to provide sealing engagement with said closure plate as said closure plate is being withdrawn from said housing.

7. A discharge assembly as claimed in claim 5 and comprising a second wiper mounted in said housing to engage the lower surface of said closure plate for removing bulk material from said closure plate as said closure plate is being withdrawn from said housing and to provide sealing engagement with said closure plate as said closure plate is being withdrawn from said housing.

8. A discharge assembly as claimed in claim 6 and comprising a third wiper in said housing spaced from said first wiper in the direction in which said closure plate is withdrawn from said housing, said third wiper engaging the upper surface of said closure plate for removing bulk material from said closure plate as said closure plate is being withdrawn from said housing.

9. A discharge assembly as claimed in claim 7 and comprising a third wiper in said housing spaced from said first wiper in the direction in which said closure plate is withdrawn from said housing, said third wiper engaging the upper surface of said closure plate for removing bulk material from said closure plate as said closure plate is being withdrawn from said housing.

10. A discharge assembly as claimed in claim 1 wherein said camming means includes a plurality of elongated cam rods mounted in said housing and extending in the direction in which said cover plate is slidable and spaced apart in a direction perpendicular to the direction in which said cover plate is slidable.

11. A discharge assembly as claimed in claim 1 wherein said camming means includes a first and second elongated cam rod mounted in said housing and extending in the direction in which said cover plate is slidable and spaced apart in a direction perpendicular to the direction in which said cover plate is slidable, said camming means including a third cam rod mounted in said housing and extending in the direction in which said cover plate is slidable and disposed intermediate said first and second cam rod.

12. A discharge assembly as claimed in claim 1 and comprising a guide plate in said housing for positioning the closure plate during the end of the slidable movement of said closure plate as said closure plate fully overlays said discharge opening.

13. A bulk material container comprising a bin disposed above a discharge assembly of said bulk material container, and a hopper in combination with said bulk material container disposed below said discharge assembly of said bulk material container, said discharge assembly comprising:

(a) a housing defining a discharge opening;

(b) a closure seal in said housing surrounding said discharge opening;

(c) a slidable closure plate disposable between a position overlaying said discharge opening and a position withdrawn from said housing, said closure plate being in engagement with said closure seal while in position overlaying said discharge opening;

(d) camming means in said housing rotatable to urge said closure plate into compressive engagement with said closure seal and rotatable to release said closure plate from compressive engagement with said closure seal to enable said closure plate to be withdrawn from said housing;

(e) a first wiper mounted in said housing to engage said closure plate while said closure plate is being withdrawn from said housing for removing bulk material from said closure plate as said closure plate is being withdrawn from said housing; and (f) said housing having an exit end for the withdrawal of said closure plate from said housing, said hopper extending beyond the exit end of said housing to receive bulk material removed from said closure plate.

14. A bulk material container in combination with a hopper as claimed in claim 13 wherein said first wiper is disposed adjacent the exit end of said housing.

15. A bulk material container in combination with a hopper as claimed in claim 14 wherein said first wiper extends in a direction perpendicular to the direction in which said closure plate is slidable and extends a distance at least as great as the dimension of said closure plate perpendicular to the direction in which said closure plate is slidable.

16. A bulk material container in combination with a hopper as claimed in claim 14 wherein said closure plate has an upper surface and a lower surface, and wherein said first wiper engages the upper surface of said closure plate.

17. A bulk material container in combination with a hopper as claimed in claim 15 wherein said closure plate has an upper surface and a lower surface, and wherein said first wiper engages the upper surface of said closure plate.

18. A bulk material container in combination with a hopper as claimed in claim 16 and comprising a second wiper mounted on said housing to engage the lower surface of said closure plate for removing bulk material from said closure plate as said closure plate is being withdrawn from said housing and to provide sealing engagement with said closure plate as said closure plate is being withdrawn from said housing.

19. A bulk material container in combination with a hopper as claimed in claim 17 and comprising a second wiper mounted in said housing to engage the lower surface of said closure plate for removing bulk material from said closure plate as said closure plate is being withdrawn from said housing and to provide sealing engagement with said closure plate as said closure plate is being withdrawn from said housing.

20. A bulk material container in combination with a hopper as claimed in claim 18 and comprising a third wiper in said housing spaced from said first wiper in the direction in which said closure plate is withdrawn from said housing, said third wiper engaging the upper surface of said closure plate for removing bulk material from said closure plate as said closure plate is being withdrawn from said housing.

21. A discharge assembly for a bulk material container comprising:

(a) a housing defining a discharge opening;

(b) a closure seal in said housing surrounding said discharge opening;

(c) a slidable closure plate disposable between a position overlaying said discharge opening and a position withdrawn from said housing, said closure plate being in engagement with said closure seal while in position overlaying said discharge opening;

(d) camming means in said housing rotatable to urge said closure plate into compressive engagement with said closure seal and rotatable to release said closure plate from compressive engagement with said closure seal to enable said closure plate to be withdrawn from said housing; and (e) an upper wiper mounted in said housing, said upper wiper comprising a plurality of feet spaced in the direction of travel of said closure plate to engage said closure plate while said closure plate is withdrawn from said housing for removing bulk material from said closure plate as said closure plate is being withdrawn from said housing.

22. A discharge assembly as claimed in claim 21 wherein said housing has an exit end for the withdrawal of said closure plate from said housing and wherein said upper wiper is disposed adjacent the exit end of said housing.

23. A discharge assembly as claimed in claim 22 wherein said upper wiper extends in a direction perpendicular to the direction in which said closure plate is slidable and extends a distance at least as great as the dimension of said closure plate perpendicular to the direction in which said closure plate is slidable.

24. A discharge assembly as claimed in claim 22 wherein said closure plate has an upper surface and a lower surface, and wherein said upper wiper engages the upper surface of said closure plate.

25. A discharge assembly as claimed in claim 24 and comprising a lower wiper mounted in said housing to engage the lower surface of said closure plate for removing bulk material from said closure plate as said closure plate is being withdrawn from said housing and to provide sealing engagement with said closure plate as said closure plate is being withdrawn from said housing.

26. A discharge assembly as claimed in claim 21 wherein said upper wiper is integrally formed.

27. A discharge assembly as claimed in claim 21 wherein said upper wiper is formed from a single piece.

28. A bulk material container in combination with a hopper as claimed in claim 13 and comprising a second wiper in said housing spaced from said first wiper in the direction in which said closure plate is withdrawn from said housing, said second wiper engaging the upper surface of said closure plate for removing bulk material from said closure plate as said closure plate is being withdrawn from said housing.

* * * * *